United States Patent [19]
Carpenter et al.

[11] Patent Number: 5,157,738
[45] Date of Patent: Oct. 20, 1992

[54] RAPID CATEGORY LEARNING AND RECOGNITION SYSTEM

[75] Inventors: Gail A. Carpenter; Stephen Grossberg, both of Newton Highlands; David B. Rosen, Brookline, all of Mass.

[73] Assignee: Trustees of Boston University, Boston, Mass.

[21] Appl. No.: 629,393

[22] Filed: Dec. 18, 1990

[51] Int. Cl.$^5$ .......................... G06K 9/62; G06K 9/00
[52] U.S. Cl. ....................................... 382/15; 382/10; 395/23; 395/25
[58] Field of Search .................. 382/14, 15, 37, 38, 382/49, 10; 364/274.9, 276.6, 513, 972.4; 395/20-27

[56] References Cited

U.S. PATENT DOCUMENTS

| | | | |
|---|---|---|---|
| 4,914,708 | 4/1990 | Carpenter et al. | 382/14 |
| 4,941,122 | 7/1990 | Weideman | 382/15 |
| 5,054,093 | 10/1991 | Cooper et al. | 382/14 |

FOREIGN PATENT DOCUMENTS

WO87/03399 6/1987 PCT Int'l Appl.

OTHER PUBLICATIONS

"The Art of Adaptive Pattern Recognition by a Self-Organizing Neural Network", by Gail A. Carpenter and Stephen Grossberg, in *Computer*, Mar. 1988, pp. 77-88.

"Art 2: Self-Organization of Stable Category Recognition Codes for Analog Input Patterns", *Applied Optics*, vol. 26, No. 23, Dec. 1987, pp. 4919-4930.

*Primary Examiner*—David K. Moore
*Assistant Examiner*—Michael Cammarata
*Attorney, Agent, or Firm*—Hamilton, Brook, Smith & Reynolds

[57] ABSTRACT

An improved ART2 network provides fast and intermediate learning. The network combines analog and binary coding functions. The analog portion encodes the recent past while the binary portion retains the distant past. LTM weights that fall below a threshold remain below threshold at all future times. The suprathreshold LTM weights track a time average of recent input patterns. LTM weight adjustment (update) provides fast commitment and slow recoding. The network incorporates these coding features while achieving an increase in computational efficiency of two to three orders of magnitude over prior analog ART systems.

15 Claims, 5 Drawing Sheets

RAPID CATEGORY LEARNING AND RECOGNITION SYSTEM

This research was supported in part by the Air Force office of Scientific Research (AFOSR 90-0175 and AFROSR 90-0128), the Army Research office (ARO DAAL-03-88-K0088), DARPA (AFOSR 90-0083), and the National Science Foundation (NSF IRI-90-00530).

BACKGROUND OF THE INVENTION

Adaptive resonance theory (ART) architectures are neural networks that self-organize stable recognition categories in real time in response to arbitrary sequences of input patterns. The basic principles of adaptive resonance theory were introduced in Grossberg, "Adaptive Pattern Classification and Universal Recoding, II: Feedback, Expectation, Olfaction and Illusions," *Biological Cybernetics*, 23 (1976) 187-202. Three classes of adaptive resonance architectures have since been characterized as systems of differential equations by Gail A. Carpenter and Stephen Grossberg.

The first class, ART 1, self-organizes recognition categories for arbitrary sequences of binary input patterns. See Carpenter and Grossberg, "Category Learning and Adaptive Pattern Recognition: A Neural Network Model," *Proceedings of the 3rd Army Conference on Applied Mathematics and Computing*, ARO Report 86-1 (1985) 37-56, and "A Massively Parallel Architecture for a Self-Organizing Neural Pattern Recognition Machine," *Computer Vision, Graphics, and Image Processing*, 37 (1987) 54-115. One implementation of an ART 1 system is presented in U.S. Application Ser. No. PCT/US86/02553, filed Nov. 26, 1986 by Carpenter and Grossberg for "Pattern Recognition System".

A second class, ART2, accomplishes the same as ART 1 but for either binary or analog inputs. See Carpenter and Grossberg, "ART2: Self-Organization of Stable Category Recognition Codes for Analog Input Patterns," *Applied Optics*, 26 (1987) 4919-4930. One implementation of an ART2 system is presented in U.S. Pat. No. 4,914,708 issued Apr. 3, 1990 to Carpenter and Grossberg for "System for Self-Organization of Stable Category Recognition Codes for Analog Input Patterns".

A third class, ART3, is based on ART2 but includes a model of the chemical synapse that solves the memory search problem of ART systems employed in network hierarchies in which learning can be either fast or slow and category representations can be distributed or compressed. See Carpenter and Grossberg, "ART3: Hierarchical Search Using Chemical Transmitters in Self-Organizing Pattern Recognition Architectures," *Neural Networks*, 3 (1990) 129-152. Also see U.S. patent application Ser. No. 07/464,247 filed Jan. 12, 1990.

SUMMARY OF THE INVENTION

The present invention provides an improved ART2 architecture which enables more efficient computation such that pattern learning and recognition are obtained in less computer processing time or with less required hardware to implement. In particular, the present invention provides an ART2 architechture with LTM (long term memory) weights which provide signals proportional to the input pattern such that learning of the input pattern is enhanced. The LTM signals effectively adapt category selection and the category generated LTM template to the input pattern in a single computational step (and hence a manner which is nearly exponential).

In a preferred embodiment, the invention network employs (a) a short term memory input field for presenting input signals defining an input pattern, and (b) a long term memory category representation field comprising a plurality of category nodes. Each category node provides template signals which define a long term memory template. Each category node also provides an indicator of state of the node with respect to commitment and/or rejection.

A selector means in the network selects at least one category node in the long term memory field based on an input pattern from the short term memory field. The template signals of the selected category node generate the corresponding long term memory (LTM) template of the selected category node.

In accordance with one aspect of the present invention, the selector means selects category nodes by weighted signals of the input pattern. A reset member of the selector means compares the weighted signals to a predefined threshold $0 \leq \rho^* \leq 1$. In response to selection of a committed category node by a weighted signal that is less than that threshold, the reset member resets category selection to an uncommitted category node in LTM.

Adjustment means adjusts the commitment and rejection states of category nodes and adapts the LTM template to the input pattern by comparing the template signals to a predefined threshold. Where a template signal falls below the threshold, the adjustment means permanently sets the template signal to zero for the subject input pattern.

Further, upon selector means selection of an uncommitted category node in the long term memory field, the adjustment means adapts the corresponding LTM template to immediately match the input pattern. Upon selector means selection of a committed category node in the long term memory field, the adjustment means adapts the LTM template to comprise a portion of the previous LTM template of the committed category node and a portion of the input pattern. Preferably, the portions of the previous LTM template and the input pattern are complimentary.

In accordance with one aspect of the present invention, in response to selection of an uncommitted category node, the adjustment means adapts the LTM template to exactly match the input pattern by the end of the input pattern presentation time in STM. This is particularly true for input pattern presentation times substantially longer than a period of time $1/(1-d)$, where $0 < d < 1$.

On the other hand in response to selection of a committed category node, the adjustment means adapts the LTM template to the input pattern at a rate slightly slower than exponential by a factor $\epsilon$, where $0 < \epsilon << 1$.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Generally by way of background, all ART networks employ an attentional subsystem and an orienting subsystem. The attentional subsystem contains in short term memory an input representation field $F_1$ (which receives input signals defining an input pattern), a category representation field $F_2$ (which holds category nodes for matching and hence recognizing input patterns of $F_1$), and pathways between the two fields. Along pathways from $F_1$ to $F_2$ there are respective bottom-up adaptive filters $F_1 \rightarrow F_2$. These filters provide long term memory (LTM) learning of input patterns, i.e. learning from some number of input patterns over a relatively long period of time. Each bottom-up filter provides an adaptive weight or LTM (long term memory) trace by which a signal along the respective path from $F_1$ to $F_2$ is multiplied. Said another way, the adaptive weights gate pattern signals from $F_1$ to $F_2$. Similar gating of pattern signals or multiplying by weights occurs along the pathways from $F_2$ to $F_1$ through top-down adaptive filters $F_2 \rightarrow F_1$. These top-down filters provide the property of category representation self-stabilization. Further the top-down filtered signals to $F_1$ form a template pattern and enable the network to carry out attential priming, pattern matching and self-adjusting parallel searching.

When a bottom-up input to $F_1$ fails to match the learned top-down template from the top-down $F_2 \rightarrow F_1$ adaptive filter corresponding to the active category node or representation in $F_2$, the orienting subsystem becomes active. In this case, the orienting subsystem rapidly resets the active category node. This reset automatically induces the attentional subsystem to proceed with a parallel search. Alternative categories are tested until either an adequate match is found or a new category is established. As will be seen later, in the present invention a new category is established immediately on reset. The search remains efficient because the search strategy through bottom-up adaptive filters is adaptively updated throughout the learning process. The search proceeds rapidly relative to the learning rate. Thus, significant changes in the bottom-up and top-down adaptive filters occur only when a search ends and a matched $F_1$ pattern resonates within the network. The network carries out a search during many initial input trials. Thereafter, however, the search mechanism is automatically disengaged with each input having direct access to its category node.

In an ART2 network, the feature representation field $F_1$ is split into a set of multiple processing levels and gain control circuits. One such circuit is associated with each input $I_i$ to node i in $F_1$. Bottom-up input patterns and top-down signals are received at different nodes in $F_1$. Positive feedback loops within $F_1$ enhance salient features and suppress noise. The multiple $F_1$ levels buffer the network against incessant recoding of the category structure as new inputs are presented. The network employs a vector analysis to define signals at the different $F_1$ nodes. And pattern matching is then by the angle between pattern vectors. In contrast, LTM equations are simpler than those of prior systems.

Figure 1:
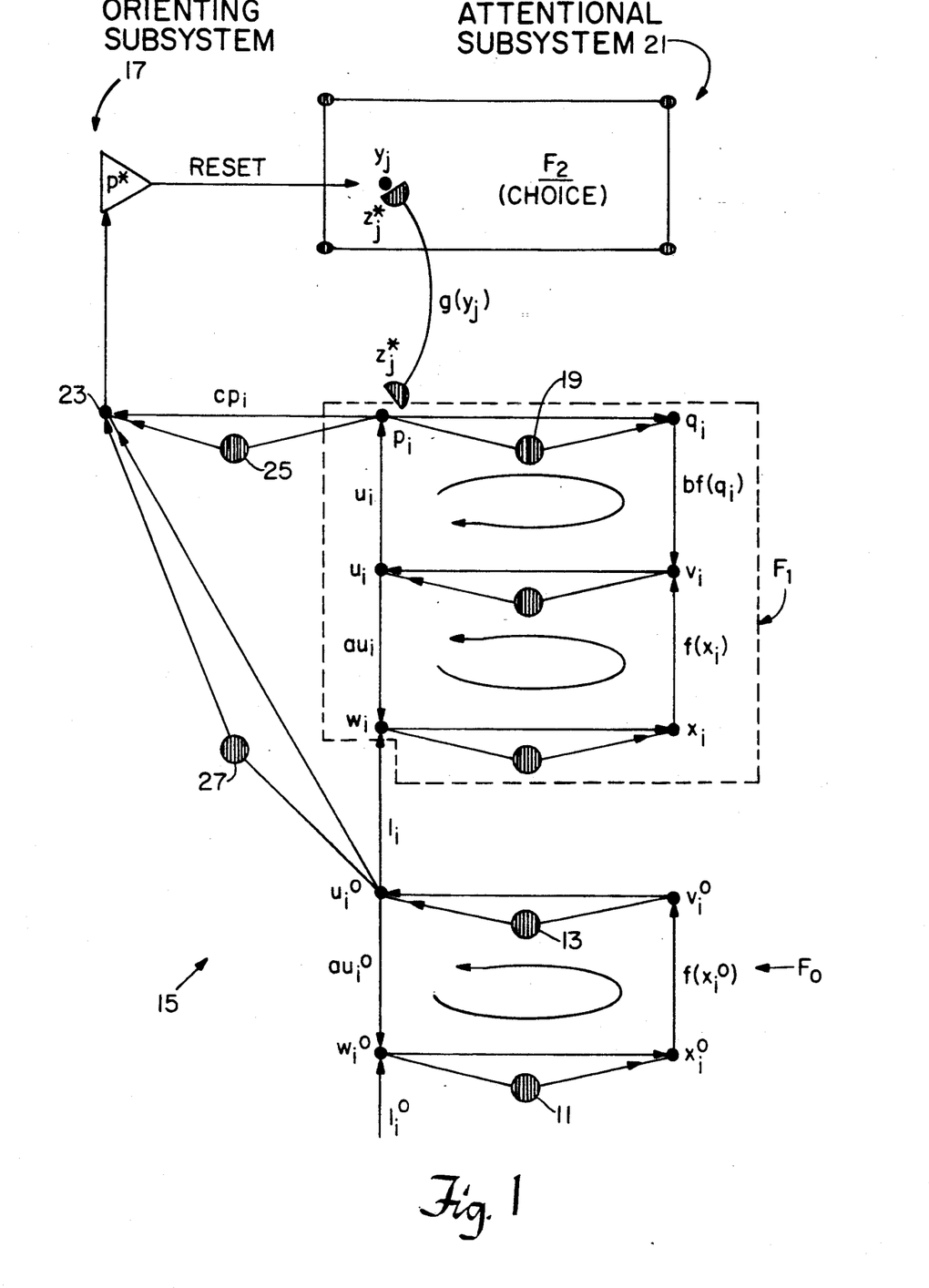
FIG. 1 is a schematic diagram of an ART2 neural network circuit modified to illustrate motivating features of the present invention.

By way of illustration and not limitation, FIG. 1 depicts one such ART2 architecture, but discussed with the present invention improvements in category learning as will become clearer hereafter. That is, the present invention network has a fundamental basis in an ART2 architecture but employs rapid computation described later which enables fast learning. For ease of understanding the present invention, details are presented first in terms of the ART2 architecture (shown in FIG. 1) followed by a general architecture embodiment of the present invention illustrated in FIG. 5.

The traditional ART2 slow learning is better able to cope with noise, but has not previously been amenable to rapid computation. Further, when fast learning is too drastic, for example in certain applications where the input set is degraded by high noise levels, the present invention's rapid computations enable a much larger range of learning rates referred to as "intermediate learning". Advantageously, intermediate learning permits partial recoding of the LTM vectors on each input presentation, thus retaining increased noise tolerance of slow learning. Further details of the present invention improvements are discussed below, preceded by a description of pertinent parts of a traditional ART2 architecture necessary for the full understanding and appreciation of the present invention.

In overview, a neural network 15 illustrated in FIG. 1 includes a two layer preprocessing field $F_0$ in short term memory (STM), a three layer representation field $F_1$ in short term memory (STM), and the circuit for processing the signal received at a single $F_1$ input node from a single selected $F_2$ category node. Across the $F_0$ and $F_1$ fields a set of signals for example $w^0_i$ and $w_i$ respectively, defines a respective subfield of the STM field. Each large circle in FIG. 1 represents the Euclidian normalization computation of all signals of a particular subfield. Each of the smaller circles denotes a computation (described below) for generating each of the subfield signals $w_i$, $x_i$, $u_i$, $v_i$ of $F_0$ and $w_i$, $x_i$, $u_i$, $v_i$, $p_i$ and $q_i$ of $F_1$.

Each layer of the $F_0$ and $F_1$ STM fields carries out two computations: vector summing of intrafield and interfield inputs to that layer, and normalizing the resulting activity vector. Specifically, pattern input represented by input vector $\vec{I}^0$ is initially received at the lower level of $F_0$. The input vector $\vec{I}^0$ is subsequently summed with the internal feedback signal vector $a\vec{u}^0$ and forms vector $\vec{w}^0$, so that $$w^0 = I^0 + au^0 \qquad \text{Equation 1}$$

Next vector $\vec{w}^0$ is normalized to yield vector $\vec{x}^0$ as denoted by the large filled circle 11 and arrowhead from $\vec{w}^0$ to $\vec{x}^0$ in FIG. 1. This is mathematically stated as $$x^0 = Nw^0 \qquad \text{Equation 2}$$

$$\text{where } Nw^0 = \frac{w^0}{\|w^0\|} \qquad \text{Equation 3}$$

or the Euclidean normalization of the vector $\vec{w}^0$. This normalization step corresponds to the effects of shunting inhibition in the competitive system of differential equations that describe the full $F_0$ dynamics. Next proceeding from the lower layer to the upper layer of preprocessing field $F_0$, vector $\vec{x}^0$ is transformed to vector $\vec{v}^0$ according to a nonlinear signal function f, such that $$v^0 = T_\theta x^0, \qquad \text{Equation 4}$$

$$\text{where } (T_\theta x^0)_i = f(x_i^0) = \begin{cases} x_i^0 & \text{if } x_i^0 > \theta \\ 0 & \text{otherwise} \end{cases} \qquad \text{Equation 5}$$

and where $\theta$ is a threshold satisfying the constraints $$0 < \theta \leq 1\sqrt{M} \qquad \text{Equation 6}$$

so that the M-dimensional vector $\vec{v}^0$ is always nonzero if vector $\vec{I}^0$ is nonuniform. If threshold $\theta$ is made somewhat larger than $1/\sqrt{M}$, input patterns that are nearly uniform will not be stored in short term memory.

The nonlinearity of the function f, embodied in the positive threshold $\theta$, is critical to the contrast enhancement and noise suppression functions of the short term memory field. Subthreshold signals are set to zero, while suprathreshold signals are amplified by the subsequent Euclidean normalization step denoted at large circle 13 in the upper $F_0$ layer which sets $$u^0 = Nv^0 \qquad \text{Equation 7}$$

N is a defined in Equation 3. As shown in FIG. 1 vector $\vec{u}^0$ equals the output vector from preprocessing field $F_0$ to the orienting subsystem 17, the internal $F_0$ feedback signal in Equation 1, and the input vector $\vec{I}$ to representation field $F_1$. Thus $$I = u^0. \qquad \text{Equation 8}$$

STM $F_0$ repeats the foregoing preprocessing for each input $\vec{I}^0$ to node i in $F_0$. More accurately, $F_0$ preprocesses series of inputs $\vec{I}^0_i$ to a node i in $F_0$ as well as preprocesses in parallel simultaneous inputs to plural nodes in $F_0$ according to the foregoing. For each such preprocessing of an input signal $I^0$, $F_0$ generates an $F_0 \to F_1$ input vector $\vec{I}$. Each $F_0 \to F_1$, input vector $\vec{I}$ reaches asymptote after a single $F_0$ iteration, as follows.

Initially all STM variables are 0. So by Equation 1, $\vec{w}^0 = \vec{I}^0$ when $\vec{I}^0$ is first presented. Equations 3 through 5 next imply that $$v_i^0 = \begin{cases} \dfrac{I_i^0}{\|I^0\|} & \text{if } I_i^0 > \theta \|I^0\| \\ 0 & \text{otherwise} \end{cases} \qquad \text{Equation 9}$$

By Equations 7 and 9 there is a constant $K > 1/\|I^0\|$ such that on the first $F_0$ iteration $$u_i^0 = \begin{cases} KI_i^0 & \text{if } i \in \Omega \\ 0 & \text{if } i \notin \Omega \end{cases} \qquad \text{Equation 10}$$

where $\Omega$ denotes the suprathreshold index set defined by $$\Omega = \{i : I_i^0 > \theta \|I^0\|\} \qquad \text{Equation 11}$$

Next by Equation 1

$$w_i^0 = \begin{cases} I_i^0(1 + aK) & \text{if } i \in \Omega \\ I_i^0 & \text{if } i \notin \Omega. \end{cases} \qquad \text{(Equation 12)}$$

Thus, at the second iteration the suprathreshold portion of $\vec{w}^0$ (where $i \in \Omega$) is amplified. The subsequent normalization by Equation 2 therefore attenuates the subthreshold portion of the pattern. Hence, the suprathreshold index set remains equal to $\Omega$ on the second iteration, and the normalized vector $\vec{u}^0$ is unchanged so long as $\vec{I}^0$ remains constant.

In sum, after a single $F_0$ iteration, the $F_0 \to F_1$ input vector $\vec{I}$ is given by $$I = NT_\theta N I^0 \qquad \text{Equation 13}$$

where $\vec{I}^0$ is a nonuniform M-dimensional input vector to $F_0$;

$$Nx = \dfrac{x}{\|x\|}; \qquad \text{Equation 14}$$

$$(T_\theta x)_i = \begin{cases} x_i & \text{if } x_i > \theta \\ 0 & \text{otherwise; and} \end{cases} \qquad \text{Equation 15}$$

$$0 < \theta \leq 1/\sqrt{M}. \qquad \text{Equation 16}$$

Equations 13 through 16 imply that vector I is nonzero. To that end, $$I_i > \theta \text{ if and only if } i \text{ is a member of } \Omega, \qquad \text{Equation 18}$$

and $$I_i = 0 \text{ if and only if } i \text{ is not a member of } \Omega, \qquad \text{Equation 18}$$

where $\Omega$ is defined by Equation 11.

As in $F_0$, each $F_1$ layer sums vector inputs and normalizes the resulting vector. The operations at the two lowest $F_1$ layers are the same as those of the two $F_0$ layers described previously. At the top $F_1$ layer, vector $\vec{p}$ is the sum of the internal $F_1$ signal $\vec{u}$ and all the $F_2 \to F_1$ filtered signals. That is, $$p_i = u_i + \Sigma g(y_j) z_{ji}, \qquad \text{Equation 19}$$

where $g(y_j)$ is the output signal from the jth $F_2$ node, and $z_{ji}$ is the LTM trace (or weight) in the path from the jth $F_2$ node to the ith $F_1$ node. As described in detail later, $z_{ji}$ from typical ART2 systems is scaled by a constant for ease of exposition and denoted $z^*_j$ in the present invention.

If $F_2$ is inactive, all $g(y_j) = 0$, so Equation 19 implies $$p = u \qquad \text{Equation 20}$$

On the other hand, if $F_2$ is active, $g(y_j) = d$, where d is a constant between 0 and 1 (i.e. $0 < d < 1$), and J denotes a node activated in $F_2$ according to the total input from $F_1$. As a result the summation in Equation 19 reduces to a single term $$P_i = u_i + dz_{Ji} \qquad \text{Equation 21}$$

More specifically, $F_2$ when active is a competitive field and is designed to make a so called "choice". The initial choice at $F_2$ is one node indexed $j=J$ which receives the largest total input from $F_1$. If more than one node $F_2$ receives maximum $F_1$ input, then one of such $F_2$ nodes is chosen at random.

Whether or not $F_2$ is active, the $F_1$ vector $\bar{p}$ is normalized to vector $\bar{q}$ at the top $F_1$ layer as indicated by the large circle 19. At the middle $F_1$ layer, vector $\bar{v}$ is the sum of (a) intrafield inputs from the bottom layer, where the $F_0 \rightarrow F_1$ bottom-up input vector $\bar{I}$ is read in, and (b) intrafield inputs from the top layer, where the $F_2 \rightarrow F_1$ top-down input is read in.

Thus, $$v_i = f(x_i) + bf(q_i) \qquad \text{Equation 22}$$

where f is defined in Equation 5.

Parameters a and b in $F_1$ are large enough so that if the ith $F_1$ node receives no top-down amplification along $f(q_i)$ then STM at that $F_1$ node is quenched even if input signal $I_i$ is relatively large. Specifically, when $z_{Ji}$ falls equal to or below $\theta/(1-d)$ then $q_i$, the value of vector $\bar{q}$ (the normalized STM vector of $\bar{p}$), falls equal to or below $\theta$. As a result $f(q_i)=0$ from Equation 5. This property allows the network to satisfy the ART design constraint that once a trace $z_{Ji}$ falls below a certain positive value, it will decay permanently to zero.

Thus, once a feature is deemed "irrelevant" in a given category, it will remain irrelevant throughout the future learning experiences of that category in that such a feature will never again be encoded into the LTM of that category, even if the feature is present in the input pattern. For example, the color features of a chair may come to be suppressed during learning of the category "chair" if these color features have not been consistently present during learning of this category.

The $F_1$ STM values that evolve when vector I is first presented, with $F_2$ inactive are then as follows. First, vector $\bar{w}$ equals vector $\bar{I}$. By Equation 13, vector $\bar{x}$ also equals vector $\bar{I}$, since $\bar{I}$ is already normalized. Next Equations 5, 17, 18 and 22 imply that vector $\bar{v}$ also equals vector $\bar{I}$, on the first interation when vector q still equals 0. To that end, $\bar{u} = \bar{p} = \bar{q} = \bar{I}$. On subsequent iterations vectors $\bar{w}$ and $\bar{v}$ are amplified by intrafield feedback, but all $F_1$ STM nodes remain proportional to vector $\bar{I}$ so long as $F_2$ remains inactive. To that end, field $F_1$ may be effectively ommitted in the general architecture of the present invention as indicated by the dotted lines in FIG. 1 and described later in FIG. 5.

Having defined vector $\bar{p}_i$, the $F_1$ input to $F_2$ in FIG. 1 is described next. The $F_1 \rightarrow F_2$ input is a sum of weighted path signals from $F_1$ nodes i to $F_2$ nodes j. In the present invention improved ART2 architecture, the input to the jth $F_2$ node is given by $$T_j = \begin{cases} \alpha \Sigma_i I_i & \text{if } j \text{ is an uncommitted node} \\ \bar{I} \cdot \bar{z}^*_j & \text{if } j \text{ is a committed node} \end{cases} \qquad \text{Equation 23}$$

where $\bar{z}^*_j$ is the scaled LTM vector defined as $(1-d)\bar{z}_j$ where $z_j$ is the bottom-up LTM weight $z_{iJ}$ of prior ART2 systems; and $$\alpha \text{ is a constant satisfying } \alpha \leq 1/\sqrt{M} \quad . \qquad \text{Equation 24}$$

As used herein the term "uncommitted" means that the activated $F_2$ node j has never been active previously. After an input presentation on which an $F_2$ node j is chosen, that node becomes "committed". Initially all $F_2$ nodes are uncommitted.

The $F_2$ nodes which then satisfy $$T_J = \max_j(T_j) \qquad \text{Equation 25}$$

form a set of possible resultants of the choice function of $F_2$ mentioned previously. Where the set contains two or more elements, i.e. more than one such node in $F_2$ is maximumly activated by the $F_1$ input defined by Equations 23 and 24, then one such node (set element) is chosen at random. At the end of the input presentation, the chosen node J becomes committed.

Chosen $F_2$ node J returns weighted signals to $F_1$ along $F_2 \rightarrow F_1$ filter paths parallel to the input $F_1 \rightarrow F_2$ filter paths to node J. That is, node J returns a different signal weighted by a respective LTM trace or weight $z_{Ji}$ to each $F_1$ node i from which node J receives and input signal. As will be seen later, the present invention actually provides scaled vector $\bar{z}^*_J$ for LTM weight $z_{Ji}$. The LTM weighted $F_2 \rightarrow F_1$ signals encode a previously learned template pattern that serves as a feedback to affect the input signal from $F_1$.

In the present invention, for a given input presentation, the top-down weighted signals from the chosen category J in $F_2$ partitions the nodes i of $F_1$ into two classes ($\Omega_J$ and NOT $\Omega_J$) and defines different dynamic properties for each class. The class $\Omega_J$ denotes a $F_1 \rightarrow F_2$ catagory index set defined as $$\Omega_J = \begin{cases} \{i: i = 1, 2 \ldots M\} & \text{if } J \text{ is an uncommitted node} \\ \{i: z_{Ji}^{(old)} > \theta/(1-d)\} & \text{if } J \text{ is a committed node.} \end{cases}$$

If i is not an element of $\Omega_J$, then $z_{Ji}$ (initially set to zero) remains equal to zero during learning. That is, LTM weight $z_{Ji}$ retains its memory of the past independent of present $F_1$ input $I_i$. On the other hand, if i is an element of $\Omega_J$, $z_{Ji}$ nearly forgets the past by becoming proportional to the present input $I_i$ during learning. The only reflection of past learning for an $F_1$ node i which is an element of $\Omega_J$ is in the proportionality constant $1/(1-d)$. Learning in the network 15 is described next.

Once an $F_2$ node J and hence $F_2$ category is selected, the orienting subsystem 17 determines whether the encoded LTM trace or template pattern is a sufficient pattern match to the input vector $\bar{I}$. If not, the orienting subsystem 17 resets the active category (chosen $F_2$ node J), thus, protecting that category from sporadic and irregular recoding. This is accomplished as follows.

Node 23 in orienting subsystem 17 receives from $F_0$ and $F_1$ an indication of the input signals to $F_2$. As necessary, the signals are normalized as indicated by large circles 25 and 27 in FIG. 1. From the indications of $F_2$ input received at node 23, the orienting subsystem 17 compares $T_J$ (the $F_1$ input to node J chosen by Equation 25) to a vigilance parameter $\rho^*$. Vigilance parameter $\rho^*$ is settable between 0 and 1 (i.e. $0 \leq \rho^* \leq 1$). Node J in catagory field $F_2$ is maintained constant if either (a) J is uncommitted, or (b) J is committed and $T_J \geq \rho^*$. If J is committed and $T_J < \rho^*$ then the orienting subsystem 17 transmits a reset signal to catagory field $F_2$. The reset signal inactivates the selected node J and hence the corresponding category. Further the reset signal activates an arbitrary uncommitted $F_2$ node. If no uncommitted nodes exist in $F_2$, the network 15 has exceeded its capacity and the input $I^0$ is not coded.

The foregoing resetting by orienting subsystem 17 and adjusting of LTM weights $z_{Ji}$ during learning provide the following:

1) for an $F_2$ category J chosen for a first time, the LTM template is made to correspond exactly with the input pattern. Said in terms of LTM weights, $z_{iJ} = z_{Ji} = I_i$;

2) for a previously chosen $F_2$ category J chosen a subsequent time with $\bar{I} \cdot \bar{z}^*_J \geq \rho^*$, the LTM template includes a portion of the previous LTM template for that category J and a portion of the current input pattern to maintain J. In particular, if an old LTM weight from $F_2$ category node J to an $F_1$ node i was less than or equal to $\theta/(1-d)$ in the previous LTM template, then the new weight from node J to that node i is restricted to zero and the other weights are adjusted to reflect the current input value of I; and 3) for a previously chosen $F_2$ category J chosen a subsequent time with $\bar{I} \cdot \bar{z}_J < \rho^*$, the LTM template of a randomly chosen uncommitted category J is made to correspond with the input pattern.

It is noted that the resetting operation of orienting subsystem 17 also supports requisite ART design constraints as follows. According to Equations 10 through 12, the $F_0$ preprocessing stage is designed to allow the network 15 to satisfy a fundamental ART design constraint that an input pattern must be able to instate itself in $F_1$ STM, without triggering reset, at least until an $F_2$ category node becomes active and sends top-down signals to $F_1$. Further according to Equations 8 and 20, vector $\bar{p} = \bar{I}$ so long as $F_2$ is inactive. This enables the network to satisfy the design constraint that no reset occurs when $F_2$ is inactive. From the above discussion, the orienting subsystem 17 has the property that no reset occurs if vectors $\bar{I}$ and $\bar{p}$ are parallel. By equation 21, vector $\bar{p}$ remains equal to vector $\bar{I}$ immediately after $F_2$ becomes active. As further explained later, vector $\bar{p}$ remains proportional to vector $\bar{I}$ during learning by an uncommitted node. This enables the network 15 to satisfy the design constraint that there be no reset when a new $F_2$ category node becomes active. That is, no reset occurs when the LTM weights in paths between $F_1$ and an active $F_2$ node have not been changed by pattern learning on any prior input presentation.

In any case, the present invention network 15 achieves resonance in about two to three orders of magnitude faster than in prior ART systems. "Resonance" means that the network 15 retains a constant code representation from $F_2$ over a time interval that is long relative to the transient time scale of $F_2$ activation and reset.

Referring back to the LTM weights $z_{ij}$ and $z_{ji}$, the basis for the increased learning rate (and hence decreased time to reach resonance) of the present invention is an update rule that adjusts the LTM weights in a single step for each input presentation interval during which the input vector I is held constant. Considering degree of increase in learning rate, a fast-learn limit is important for system analysis and is useful in many applications. However, a finite learning rate is often desirable to increase stability and noise tolerance, and to make the category structure less dependent on input presentation order. The present invention features intermediate learning rates, which provide these advantages, and which include fast learning as a limiting case (i.e. upper limit). Further, the present invention intermediate learning embodies the properties of fast commitment and slow recoding.

In contrast, LTM vectors of prior ART2 architectures tend to approach asymptote much more quickly when the active node J is uncommitted than when J is committed. And once J is committed, the normalized value of $z_{iJ} = z_{Ji}$ (denoted $\|z_J\|$) stays close to $1/(1-d)$, where $0 < d < 1$.

In the present invention $\bar{z}_j$ denotes the scaled LTM vector (for both bottom-up and top-down directions) of node j in $F_2$ and is defined by $$z^*_j = (1-d)z_j \qquad \text{Equation 26;}$$

where $\bar{z}_j$ indicates bottom-up LTM weights $z_{ij}$ to a category node j in $F_2$ as well as top-down LTM weights $z_{ji}$ from node j to nodes i in $F_1$. Initially all top-down LTM weights $\bar{z}^*_j$ are set equal to zero (corresponding to $z_{ji} = 0$). This not only aids the previously noted constraint that no reset occur when $F_2$ is inactive but further allows vector $\bar{p}$ to remain equal to vector $\bar{I}$ according to Equation 18 immediately after $F_2$ becomes active.

The bottom-up LTM weights $z^*_j$ (corresponding to $z_{ij}$) satisfy $$\frac{dz_{ij}}{dt} = g(y_j)[p_i - z_{ij}]$$

and are initially set between zero and a constant. This constant needs to be small enough such that after learning, an input will subsequently select its own category node j in $F_2$ over an uncommitted category node. Larger values of this constant bias the network 15 toward selection of an uncommitted $F_2$ node over another $F_2$ node whose LTM vector only partially matches the input vector from $F_1$. Preferably the initial value of the bottom-up LTM weights includes random noise so that different $F_1 \rightarrow F_2$ signals are received at different category nodes j in $F_2$.

Once $F_2$ is active, the network 15 maintains vector $\bar{p}$ proportional to vector $\bar{I}$ to satisfy the ART constraint that no reset occurs when an uncommitted $F_2$ node becomes active (i.e. $F_2$ node j is activated for a first time). This is accomplished by both top-down and bottom-up LTM vectors $z_{ji}$ and $z_{ij}$ approaching a limit vector $\Psi$ or a vector proportional thereto during learning. Limit vector $\Psi$ is defined by $$\Psi_i = \begin{cases} I_i & \text{if } z^{*(old)}_{ji} > \theta \\ 0 & \text{otherwise,} \end{cases} \qquad \text{Equation 27}$$

where

-continued $$z^{*(old)}_{Ji} = \begin{cases} z^*_{Ji} & \text{at the start of input presentation,} \\ & \text{if } J \text{ is a committed node} \\ 0 & \text{if } J \text{ is an uncommitted node.} \end{cases}$$

Equation 5

Further, to incorporate intermediate learning, and especially fast commitment and slow recoding, into the learning of $F_2$, the network 15 employs the following. For category node $j=J$, the scaled LTM vectors between node J in $F_2$ and nodes i of $F_1$ denoted $z^*_J$ satisfies $$\frac{dz^*_J}{dt} = (1-d)(d - z^*_J)$$

Equation 28

By Equation 28, vector $\vec{z}^*_J$ approaches vector $\vec{u}$ at a fixed rate. In particular when J is an uncommitted node in $F_2$, vector $\vec{u}$ remains identically equal to vector $\vec{I}$ throughout the input presentation. Thus, vector $\vec{z}^*_J$ approaches vector $\vec{I}$ exponentially, and both bottom-up and top-down LTM vectors $\vec{z}^*_J \approx \vec{I}$ at the end of the input presentation if the presentation interval is long relative to $1/(1-d)$. On the other hand, if J is a committed node, vector $\vec{u}$ is close to vector $\vec{z}^*_J$. In other words, $$u = N(\epsilon N\Psi + (1-\epsilon)z^*_J)$$

Equation 29 where $\Psi$ is defined in Equation 27 and $0 < \epsilon < < 1$. Since $\epsilon$ is small, $$u \approx \epsilon N\Psi + (1-\epsilon)z^*_J$$

Equation 30

Thus, Equations 28 and 30 imply $$\frac{dz^*_J}{dt} \approx \epsilon(1-d)(N\Psi - z^*_J)$$

Equation 31

Hence, vector $\vec{z}^*_J$ begins to approach $N\Psi$ at a rate that is slower, by a factor $\epsilon$, than the rate of convergence of an uncommitted node. The size of $\epsilon$ is determined by the parameters a and b in FIG. 1. From common ART2 parameter constraints that a and b be large, the present invention makes $\epsilon$ small.

In summary if the network input presentation time is large relative to $1/(1-d)$, the LTM vectors ($\vec{z}_{ij}$ and $\vec{z}_{ji}$) of an uncommitted node J converge to $\vec{I}$ on the first activation of that node. Subsequently the LTM vectors remain approximately equal to vector $\vec{z}^*_J$, where $$(1-d)\|z_J\| \approx \|z^*_J\| \approx 1$$

Equation 32.

Because vector $\vec{z}^*_J$ is normalized when J first becomes committed and by Equation 28 it approaches vector $\vec{u}$, which is both normalized and approximately equal vector $\vec{z}^*_J$, $\vec{z}^*_J$ remains approximately normalized during learning. Finally, Equations 28 and 29 suggest that a (normalized) convex combination of the $N\Psi$ and $\vec{z}^*_J$ vector values at the start of an input presentation gives a reasonable first approximation to $\vec{z}^*_J$ at the end of the presentation. With that, at the end of an input presentation, $\vec{z}^*_J$ is set equal to $\vec{z}^*_J{}^{(new)}$ defined by $$z^{*(new)}_J = \begin{cases} I & \text{if } J \text{ is an uncommitted node} \\ N(\beta N\Psi + (1-\beta)z^{*(old)}_J) & \text{if } J \text{ is a committed node} \end{cases}$$

Equation 33 where $0 \leq \beta \leq 1$,

Equation 34 and $\vec{z}^*_J{}^{(old)}$ is as defined for Equation 27.

In ART2 terms, at the end of the input presentation $z_{iJ} = z_{Ji} = \vec{z}_J{}^{(new)} = N\Psi/(1-d)$.

The present invention LTM weight update rule (Equation 33) for a committed node is similar in form to Equation 29. However, Equation 29 describes the STM vector $\vec{u}$ immediately after a category node J has become active, before any significant learning has taken place, and parameter $\epsilon$ in Equation 29 is small. The present invention approximates a process that integrates the form factor Equation 29 over the entire input presentation interval. Hence, $\beta$ ranges from 0 to 1 in equation 34. Setting $\beta$ equal to 1 provides the fast learn-limit in the present invention. Setting $\beta$ equal to 0 turns the present invention network of FIG. 1 into a type of leader algorithm with the weight vector $\vec{z}^*_J$ remaining constant once J is committed. Small positive values of $\beta$ yield system properties similar to those of a typical ART2 slow learning system. Fast commitment is obtained, however, for all values of $\beta$. Note that $\beta$ could vary from one input presentation to the next, with smaller values of $\beta$ corresponding to shorter presentation intervals and larger values of $\beta$ corresponding to longer presentation intervals.

Parameter $\alpha$ in Equation 23 corresponds to the initial values of LTM components in a typical ART2 $F_1 \rightarrow F_2$ weight vector. As in Equation 24 $\alpha$ needs to be small enough so that if $\vec{z}^*_J$ equals $\vec{I}$ for some J, then J will be chosen when $\vec{I}$ is presented. Setting $\alpha$ close to $1/\sqrt{M}$ biases the network 15 towards selection of an uncommitted $F_2$ node over $F_2$ category nodes that only partially match input $\vec{I}$. In the simulations described below, $\alpha$ is set equal to $1/\sqrt{M}$. Thus, even when $\rho^*$ equal 0 and reset never occurs, the present invention architecture can establish several categories. Instead of randomly selecting any uncommitted node after reset, the value $\alpha$ for all $T_j$ in Equation 23 could be replaced by any function of j, such as ramp or random function, that achieves the desired balance between selection of committed and uncommitted nodes, and a determinate selection of a definite uncommitted node after a reset event.

Figure 5:
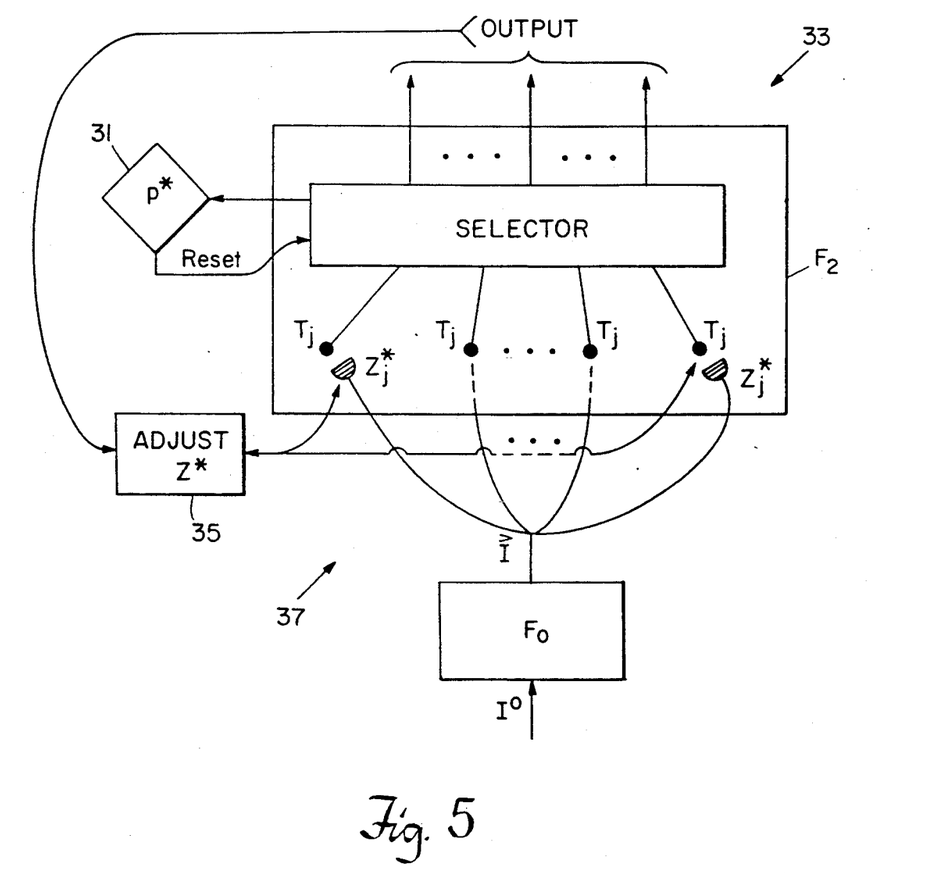
FIG. 5 is an illustration of a general neural network embodiment of the present invention.

Referring now to FIG. 5, the architecture of the present invention is shown in general terms as opposed to ART2 terms as in FIG. 1. The network 37 in FIG. 5 has attentional subsystem 33 (formed of fields $F_0$, $F_2$ and adjustments means 35) and orienting subsystem 31. In the attentional subsystem 33, the preprocessing field $F_0$ is as described for FIG. 1 with $a\vec{u}^0 = 0$ and an output of vector $\vec{I}$. According to Equation 23, vector $\vec{I}$ is directly input to node j in $F_2$. Thus $F_0$ is considered the STM input field.

$F_2$ comprises a plurality of nodes j. Each node j receives input signals $T_j$ (from $I \cdot z^*_j$) and has states of committed/noncommitted and rejected. A choice is made in $F_2$ according to Equation 25 such that the $F_2$ node receiving the greatest input from the field $F_0$ is selected. Other selection or choice functions are suitable.

Working in conjunction with the choice function is the orienting subsystem 31, the two components forming a selector means of the present invention. The orienting subsystem 31 of FIG. 5 is as described for the orienting subsystem 17 of FIG. 1. Briefly orienting subsystem 31 compares $T_J$ of Equation 25 (the $F_0$ input to selected node J) to vigilance parameter $\rho^*$ ($0 \leq \rho^* \leq 1$). If node J is committed and $T_J < \rho^*$ orienting subsystem 31 resets the selected category to an arbitrary uncommitted category ($F_2$ node).

It is understood that "reset" is synonymous with "rejection" in the present invention. That is, the more general form of reset involves having orienting subsystem 31 set the "rejection state" of the current choice of the $F_2$ choice function, so that when the choice in $F_2$ selects again, it will not select the same node j. In the preferred embodiment as stated above, this results in the $F_2$ choice selecting an uncommitted category node j in $F_2$.

The selected node J in $F_2$ transmits template signals in response to activation by $F_0$ signals $\vec{I}$. After an input presentation on which an $F_2$ node j is chosen and not rejected by orienting subsystem 31, that node becomes "committed". Initially all $F_2$ nodes are uncommitted.

As for weights $\vec{z}^*_j$, according to Equations 26, 28 and 33 there is a single LTM trace $z^*_j$ between each node i in the input field and each node j in $F_2$. After the choice in $F_2$ without rejection by orienting subsystem 31, weights $z^*_j$ are adjusted in response to each input pattern according to Equation 33. The adjustment is performed such that the LTM template generated by selected (without rejection) $F_2$ node J is adapted proportionally to the input pattern.

In particular, if selected (without rejection) node J is an uncommitted node then the LTM trace $\vec{z}^*_J$ (and hence corresponding template) is updated to equal the input vector $\vec{I}$ (and hence input pattern). If selected (without rejection) node J is a committed node then, the LTM trace $\vec{z}^*_J$ (and hence corresponding template) is updated to comprise a portion of the previous LTM trace (and hence previous LTM template) and a complimentary portion of the input vector $\vec{I}$ (and hence input pattern), except that adjustment means 35 compares a predefined threshold $0 \leq \theta \leq 1$ to template signals of selected node j. And for each template signal below the threshold, the adjustment means 35 permanently sets those template signals to 0.

The foregoing functioning of the attentional subsystem 33 and orienting subsystem 31 enable network 37 to achieve resonance in nominal computation time compared to that of prior art networks. That is, the foregoing features of the present invention provide fast committment, slow recoding and computational efficiency in pattern recognition and learning.

It is understood that the foregoing fast learn network 37 of the present invention can be incorporated in more complex architectures in a similar manner as that disclosed for prior ART2 systems in U.S. Pat. No. 4,914,708. Details of such incorporation and processing environment are herein incorporated by reference.

Figure 2:
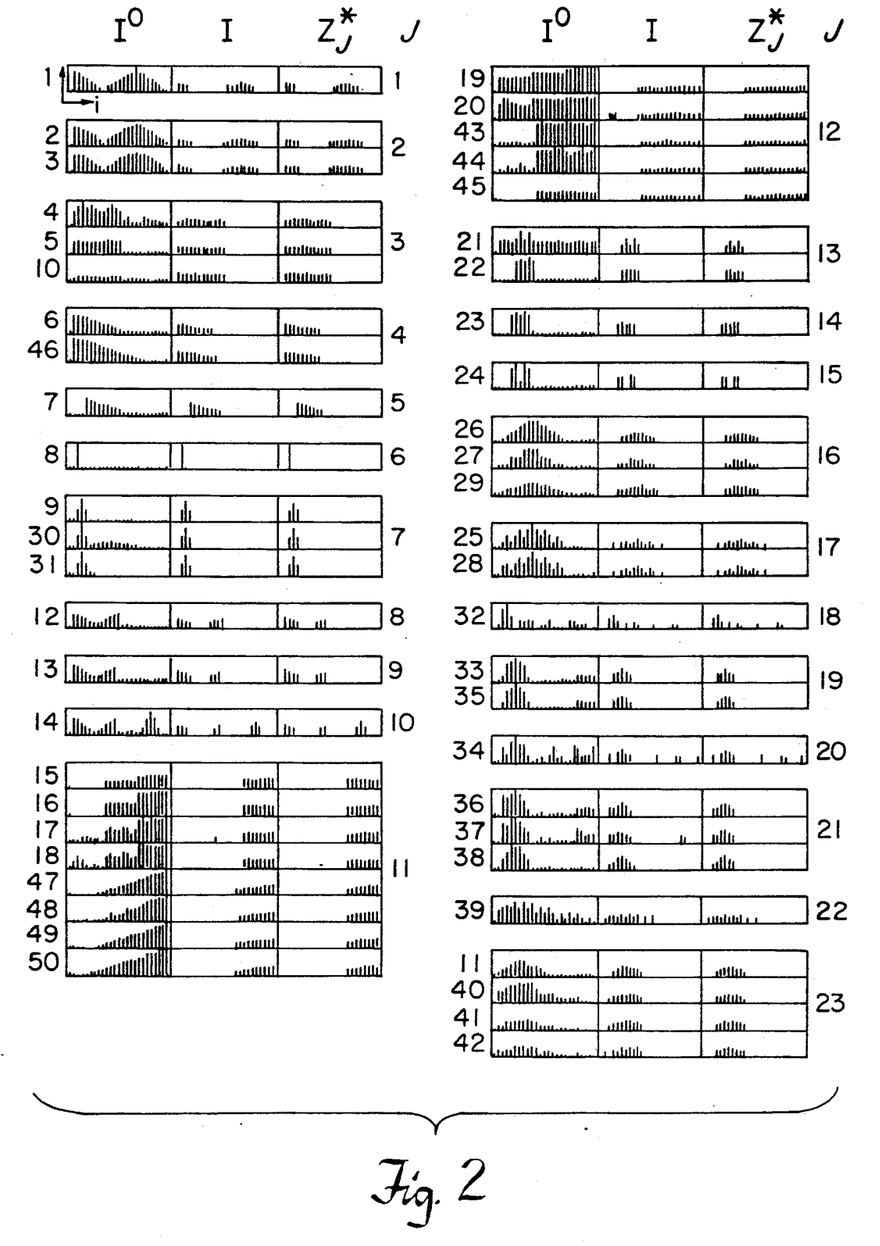
FIG. 2 illustrates fast learning of 50 patterns in 23 categories utilizing a system embodying the present invention.

FIG. 2 illustrates a set of 50 analog patterns which have been categorized (i.e. grouped and learned) by a network of the present invention. Patterns in the column headed $I^0$ represent the input pattern to $F_0$. Each pattern is a plot of an input signal $I^0_i$ (along the vertical axis) against a set of input nodes i (along the horizontal axis) which are applied in parallel to the preprocessing field $F_0$. The pattern may, for example, be a spatial pattern across spatial inputs. Or the pattern may be temporal with the intensity $I^0_i$ plotted against time $T_i$.

Each input pattern is indexed in the left hand column according to order of presentation. The input patterns were repeatedly presented in order (1, 2 .. 50) until category structure stabilized. In the interim, after preprocessing in $F_0$, input patterns to representation field $F_1$ were formed. The formed input patterns are illustrated as corresponding to respective input patterns at $I^0$ and are represented by signals plotted along a vertical I signal axis against a horizontal $F_1$ node i axis. From these signals, one of 23 category nodes J (indexed on the right hand column of FIG. 2) in category field $F_2$ was selected. The category structure stabilized to asypmtotic state during the second presentation of the entire input set. However, the suprathreshold LTM components continued to track the relative magnitudes of the components in the most recent input. FIG. 2 illustrates the initial inputs grouped according to the $F_2$ category node J chosen during the second and subsequent presentations of each input.

The scaled LTM vector $\vec{z}^*_J$ of the winning $F_2$ category node J at the end of each input presentation interval is shown for each input pattern in the column headed $z^*_J$. The vector value is plotted along the vertical axis against the $F_1$ node i plotted along the horizontal axis. It is noted that the vertical axes for I and $z^*_J$ run from 0 to 1.

Category 23 in FIG. 2 shows how $\vec{z}^*_J$ tracks the suprathreshold analog input values in feature set $\Omega_J$ while ignoring input values outside that set. Feature set $\Omega_J$ is the $F_1 \rightarrow F_2$ category index set described previously. Intuitively $\Omega_J$ is the index set of critical features that define category J. In fast learning, the set $\Omega_J$ can shrink when J is active, but can never grow. This monotonicity property is necessary for overall code stability. On the other hand, $z_{Ji}$ learning is still possible for i included in $\Omega_J$ when J is active.

The fast-learn categorizing of the present invention illustrated in FIG. 2 utilizes the parameter settings summarized in Table I and used only four seconds of Sun4/110 CPU time to run through the 50 patterns three times. A corresponding categorizing by a prior ART2 system takes 25 to 150 times as long to produce the same results as FIG. 2, depending on the fast-learn convergence criterion imposed. This increase in computational efficiency occurs even using a fast integration method for the prior ART2 system in which LTM values were allowed to relax to equilibrium alternatively with STM variables.

TABLE I

Figure 3:
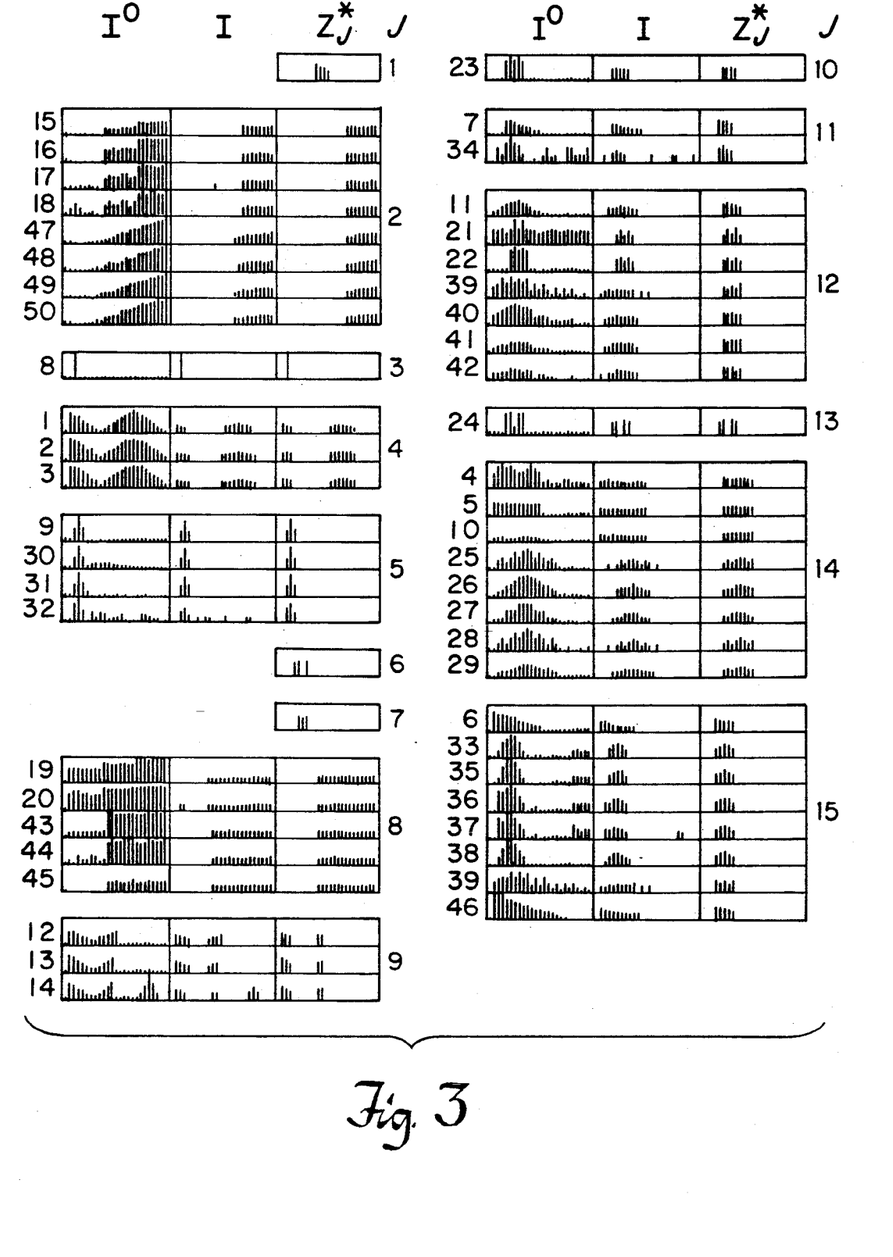
FIG. 3 illustrates fast learning of randomly input patterns in the system of FIG. 2.
Figure 4:
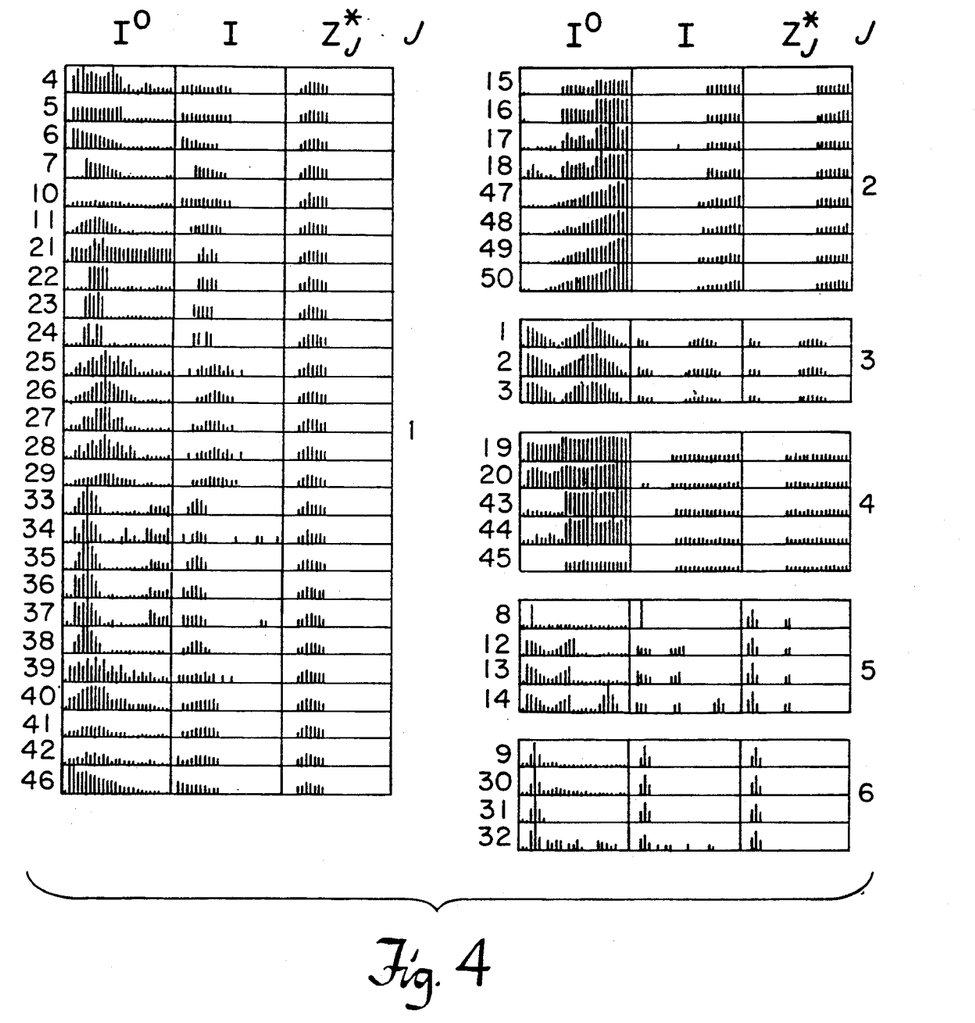
FIG. 4 illustrates intermediate learning of randomly input patterns utilizing the system of FIG. 2.

| Parameters for FIGS. 2-4 | | | |
|---|---|---|---|
| Parameter | Value | | |
| M | 25 | | |
| $\alpha$ | $\frac{1}{\sqrt{M}} = .2$ | | |
| $\theta$ | $\frac{1}{\sqrt{M}} = .2$ | | |
| | FIG. 2 | FIG. 3 | FIG. 4 |
| $\rho^*$ | .92058 | 0 | 0 |
| $\beta$ | 1 | 1 | .01 |

FIG. 3 illustrates fast-learn categorizing of the 50 input patterns of FIG. 2 but presented randomly rather than cyclically to an embodiment of the present invention. FIG. 4 illustrates the intermediate learn categorization of the same randomly presented 50 input patterns as FIG. 3. This random presentation regime simulates a statistically stationary environment, in which each member of a fixed set of patterns is encountered with equal probability at any given time. In addition, $\rho^*$ was set to 0 in the operations of the present invention illustrated in FIGS. 3 and 4, making the number of categories more dependent on parameter $\alpha$ than when $\rho^*$ is large. Other parameters are given in Table I.

FIGS. 3 and 4 show the asymptotic category structure and scaled LTM weight vectors established after an initial transient phase of 2,000 to 3,000 input presentations. FIG. 3 illustrates that category nodes may occasionally be abandoned after a transient encoding phase (see nodes J=1, 6, and 7). FIG. 3 also includes a single input pattern (index 39) that appears in two categories (J=12 and 15). In the illustration of FIG. 3 input index 39 was usually placed in category J=12. However, when the most recent input to category J=12 was input pattern index 21, category J=15 could win in response to input index 39, though whether or not it did depended on which pattern category J=15 had coded most recently as well. In addition to depending on input presentation order, the instability of pattern index 39 is promoted by the system being in the fast-learn limit with a small value of $\rho^*$, here $\rho^*$ equals 0. A corresponding prior ART2 system gives similar results but takes two to three orders magnitude longer than the present invention network.

The foregoing anomalies did not occur in the intermediate-learn case, in which there is not such drastic recoding on each input presentation. Similarly intermediate learning copes better with noisy inputs than does fast learning. FIG. 4 illustrates a run by an embodiment of the present invention with the inputs and parameters of FIG. 3, except that the learning rate parameter is small ($\beta=0.01$). The analog values of the suprathreshold LTM components do not vary with the most recent input nearly as much as the components in FIG. 3. A slower learning rate helps the present invention to stabilize the category structure by making coding less dependent on order of input presentation.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A pattern recognition device, comprising:
   a short term memory input field for presenting input signals defining an input pattern, the input pattern having certain properties;
   a long term memory category representation field comprising plural category nodes, each such node (i) providing template signals defining a corresponding long term memory template, and (ii) having an indication of state of the node including commitment and rejection states of the node;
   selector means for selecting at least one category node in the long term memory field as a function of at least the input pattern from the short term memory field; and
   adjustment means responsive to each input pattern, for adjusting commitment and rejection states of category nodes and for adapting the corresponding long term memory template of the selected node to the input pattern, such that (i) upon the selector means selecting an uncommitted category node, the adjustment means adapts the corresponding long term memory template to match the input pattern, and (ii) upon the selector means selecting a committed category node, the adjustment means adapts the corresponding long term memory template to comprise a portion of a previous long term memory template of the committed category node and a complementary portion of the input pattern, said adapting by the adjustment means including (a) comparing template signals to a predetermined threshold, and (b) for each template signal falling below the threshold, permanently setting the template signal to zero.

2. A pattern recognition device as claimed in claim 1 wherein in response to selector means selection of an uncommitted category node, the adjustment means adapts the corresponding long term memory template to match the input pattern by the end of input pattern presentation time in the short term memory field.

3. A pattern recognition device as claimed in claim 1 wherein in response to selector means selection of a committed category node, the adjustment means adapts the corresponding long term memory template to approach the input pattern in a single computational step.

4. A pattern recognition device as claimed in claim 1 wherein the predetermined threshold is in the range 0 to 1 inclusive.

5. A pattern recognition device as claimed in claim 1 wherein:
   the selector means selects category nodes by weighted signals of the input pattern; and
   the selector means further comprises a reset member such that in response to selector selection of a committed category node by a weighted signal less than threshold $\rho^*$, the reset member resets category selection to an uncommitted category node, said threshold being predefined as $0 \leq \rho^* \leq 1$.

6. A pattern recognition device as claimed in claim 1 wherein for each adaptation, the adjustment means adapts the corresponding long term memory template proportionally to the input pattern.

7. A pattern recognition device, comprising:
   a short term memory input field for providing input signals defining an input pattern;
   a long term memory field comprising plural category nodes, each such note (i) providing template signals defining a corresponding long term memory template and (ii) having an indication of state of the node, including commitment and rejection states thereof;
   selector means for selecting at least one category node in the long term memory field based on the input pattern from the short term memory field; and
   adjustment means for adjusting commitment and rejection states of category nodes and for adapting the corresponding long term memory template of the selected node to the input pattern in response to the input pattern such that
   i) selector means selection of a previously uncommitted category node results in adjustment means adapting the corresponding long term memory template to immediately match the input pattern, and ii) selector means selection of a previously committed category node results in adjustment means adapting the corresponding long term memory template to comprise complementary portions of the previous long term template of the selected category node and the input pattern.

8. A pattern recognition device as claimed in claim 7 wherein the adjustment means adapts the corresponding long term template to the input pattern at a nearly exponential rate.

9. A pattern recognition as claimed in claim 7 wherein the adjustment means adapts the corresponding long term memory template to the input pattern by comparing template signals to a predetermined threshold, such that for a template signal below the threshold, the adjustment means permanently sets the template signal to zero.

10. In a pattern recognition device having a) a short term memory field for providing input signals defining an input pattern, b) a long term memory field comprised of category nodes, each such node providing template signals defining a long term memory template, and c) a selector for selecting at least one category node in the long term memory field based on an input pattern from the short term memory field, template signals of the selected node generating a corresponding long term memory template, a method of adapting the corresponding template to the input pattern, said method comprising the steps of:

comparing template signals to a predefined threshold;

for each template signal below the threshold permanently setting the template signal to zero;

when the selector selects an uncommitted category node, adapting the corresponding template to match the input pattern; and when the selector selects a committed category node, adapting the corresponding template to comprise a portion of a previous long term memory template of the committed category node and a complementary portion of the input pattern.

11. A method as claimed in claim 10 further comprising the steps of:

providing an indication of commitment and rejection states of each category node;

adjusting commitment and rejection states of category nodes in response to an input pattern;

in response to selector selection of a previously uncommitted category node, adapting the corresponding long term memory template to immediately match the input pattern; and in response to selector selection of a previously committed category node, adapting the corresponding long term memory template to include a combination of a portion of the previous long term template of the selected category node and a complementary portion of the input pattern.

12. A method as claimed in claim 11 further comprising the step of resetting selection of a committed category node to an uncommitted category node where a weighted signal of category selection is less than threshold $\rho^*$, where $\rho^*$ is predefined in the range 0 to 1 inclusive.

13. A method as claimed in claim 10 further comprising the step of adaptation the corresponding long term memory template proportionally to the input pattern for each adaption thereto.

14. A pattern recognition device, comprising:

a short term memory input field for presenting input signals defining an input pattern, the input pattern having certain properties;

a long term memory category representation field comprising plural category nodes, each such node (i) providing template signals defining a long term memory template, and (ii) having an indication of state of the node including commitment and rejection states of the node;

selector means for selecting at least one category node in the long term memory field by weighted signals of the input pattern, said selector means comprising a reset member such that, in response to selector selection of a committed category node by a weighted signal less than threshold $\rho^*$, the reset member resets category selection to an uncommitted category node, said threshold being predefined as $0 \leq \rho^* \leq 1$; and adjustment means responsive to each input pattern, for adjusting commitment and rejection states of category nodes and for adapting the corresponding long term memory template of the selected node to the input pattern, said adapting by the adjustment means including (a) comparing template signals to a predetermined threshold, and (b) for each template signal falling below the threshold, permanently setting the template signal to zero.

15. In a pattern recognition device having a) a short term memory field for providing input signals defining an input pattern, b) a long term memory field comprised of category nodes, each such node providing template signals defining a long term memory template, and c) a selector for selecting at least one category node in the long term memory field based on an input pattern from the short term memory field, template signals of the selected node generating a corresponding long term memory template, a method of adapting the corresponding template to the input pattern comprising the steps of:

providing an indication of commitment and rejection states of each category node;

adjusting commitment and rejection states of category nodes in response to an input pattern;

in response to selector selection of a previously uncommitted category node, adapting the corresponding long term memory template to immediately match the input pattern;

in response to selector selection of a previously committed category node, adapting the corresponding long term memory template to include a combination of a portion of the previous long term template of the selected category node and a complementary portion of the input pattern;

comparing template signals to a predefined threshold; and for each template signal below the threshold permanently setting the template signal to zero.

* * * * *

UNITED STATES PATENT AND TRADEMARK OFFICE
CERTIFICATE OF CORRECTION

PATENT NO. : 5,157,738
DATED : October 20, 1992
INVENTOR(S) : Gail A. Carpenter, Stephen Grossberg and David B. Rosen It is certified that error appears in the above-indentified patent and that said Letters Patent is hereby corrected as shown below:

In column 1, line 9, after "NSF-IRI-90-00530)," insert --and the Department of the Navy, Grant N00014-91-J-4100--.

Signed and Sealed this

Seventh Day of January, 1997

Attest:

BRUCE LEHMAN

*Attesting Officer*     *Commissioner of Patents and Trademarks*